(12) United States Patent
Zhu et al.

(10) Patent No.: US 12,052,511 B2
(45) Date of Patent: Jul. 30, 2024

(54) METHOD AND APPARATUS FOR GENERATING IMAGE DATA

(71) Applicant: INTELLINDUST INFORMATION TECHNOLOGY (SHENZHEN) CO., LTD, Shenzhen (CN)

(72) Inventors: Caizhi Zhu, Shenzhen (CN); Peizhe Ru, Shenzhen (CN); Xiao Zhou, Shenzhen (CN); Lin Wang, Shenzhen (CN)

(73) Assignee: INTELLINDUST INFORMATION TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/791,126

(22) PCT Filed: Feb. 18, 2022

(86) PCT No.: PCT/CN2022/076725
§ 371 (c)(1),
(2) Date: Dec. 29, 2022

(87) PCT Pub. No.: WO2022/267494
PCT Pub. Date: Dec. 29, 2022

(65) Prior Publication Data
US 2024/0179421 A1    May 30, 2024

(30) Foreign Application Priority Data
Jun. 22, 2021   (CN) .......................... 202110690725.8

(51) Int. Cl.
*H04N 23/80* (2023.01)
*G06T 5/60* (2024.01)
(Continued)

(52) U.S. Cl.
CPC ............... *H04N 23/80* (2023.01); *G06T 5/60* (2024.01); *H04N 23/71* (2023.01); *H04N 23/76* (2023.01); *G06T 2207/20081* (2013.01)

(58) Field of Classification Search
None
See application file for complete search history.

(56) References Cited

U.S. PATENT DOCUMENTS

| | | | |
|---|---|---|---|
| 11,189,017 B1 * | 11/2021 | Baqai | .................. H04N 23/743 |
| 2009/0040516 A1 | 2/2009 | Fritz | |
| 2020/0132437 A1 | 4/2020 | Stavis et al. | |

FOREIGN PATENT DOCUMENTS

| | | |
|---|---|---|
| CN | 101052096 | 10/2007 |
| CN | 101600113 | 12/2009 |

(Continued)

OTHER PUBLICATIONS

Yu, Jiang. (2015) Research on Denoising the Low Level Imaage [Masters dissertation, Hangzhou Dianzi University].

*Primary Examiner* — James M Hannett
(74) *Attorney, Agent, or Firm* — Meunier Carlin & Curfman LLC

(57) ABSTRACT

A method and an apparatus for generating image data, which relate to the technical field of image processing. The method comprises: obtaining a first pixel value of each pixel in a first image based on original pixel values of the first image acquired by an image acquisition device when ambient light brightness is greater than a first preset brightness threshold; obtaining a second pixel value of each pixel by dividing the first pixel value of this pixel by a preset multiple; the second preset brightness threshold is less than the first preset brightness threshold; obtaining a third pixel value of each pixel by adding Poisson noise based on a total system gain of the image acquisition device on the basis of the second pixel value of this pixel; generating original pixel values of (Continued)

a target image which corresponds to the first image for which the ambient light brightness is less than the second preset brightness threshold based on respective third pixel values. In this way, the generation efficiency of image data can be improved.

18 Claims, 6 Drawing Sheets

(51) Int. Cl.
*H04N 23/71* (2023.01)
*H04N 23/76* (2023.01)

(56) References Cited

FOREIGN PATENT DOCUMENTS

| | | |
|---|---|---|
| CN | 104050645 | 9/2014 |
| CN | 104702852 | 6/2015 |
| CN | 109949353 | 6/2016 |
| CN | 108055486 | 5/2018 |
| CN | 108986050 | 12/2018 |
| CN | 110114799 | 8/2019 |
| CN | 110610463 | 12/2019 |
| CN | 111260579 | 6/2020 |
| CN | 111401411 | 7/2020 |
| CN | 113256537 | 8/2021 |
| WO | 2020187423 | 9/2020 |

\* cited by examiner

METHOD AND APPARATUS FOR GENERATING IMAGE DATA

The present application claims the priority to a Chinese patent application No. 202110690725.8, filed with the China National Intellectual Property Administration on Jun. 22, 2021 and entitled "METHOD AND APPARATUS FOR GENERATING IMAGE DATA", which is incorporated herein by reference in its entirety.

TECHNICAL FIELD

The present application relates to the field of image processing technology, and in particular to a method and an apparatus for generating image data.

BACKGROUND

With the rapid development of computer technology, the way of using image acquisition device to acquire and process images is widely used in security, intelligent transportation and other aspects. However, when the brightness of the ambient light is insufficient, the image acquired by the image acquisition device will contain much noise, making the image unclear and further reducing the accuracy of the processing result.

To this end, image enhancement processing may be performed on the acquired image based on an image enhancement network model to remove noise in the acquired image. However, training the image enhancement network model requires a large number of sample images. In the related art, technicians usually manually acquire sample images under conditions of sufficient ambient light brightness and insufficient ambient light brightness through an image acquisition device, and then use the image data of the acquired sample images as training samples to train the image enhancement network model of a preset structure.

It may be seen that, in the related art, manually acquiring images through an image acquisition device will reduce the generation efficiency of image data.

SUMMARY

The purpose of the embodiments of the present application is to provide a method and an apparatus for generating image data, so as to improve the generation efficiency of image data. Specifically, the technical solutions are as follows.

In a first aspect, in order to achieve the above object, an embodiment of the present application discloses a method for generating image data. The method comprises: obtaining a first pixel value of each pixel in a first image based on original pixel values of the first image acquired by an image acquisition device when ambient light brightness is greater than a first preset brightness threshold; obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold; obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; generating original pixel values of a target image which corresponds to the first image for which the ambient light brightness is less than the second preset brightness threshold based on respective third pixel values.

Optionally, obtaining a third pixel value of each pixel by adding Poisson noise based on a total system gain of the image acquisition device on the basis of the second pixel value of this pixel, comprises: obtaining a number of charges corresponding to each pixel as a first charge number by dividing the second pixel value of this pixel by the total system gain of the image acquisition device; obtaining a second charge number corresponding to this pixel by adding Poisson noise on the basis of the first charge number corresponding to this pixel; obtaining the third pixel value of this pixel by multiplying the second charge number corresponding to this pixel by the total system gain.

Optionally, the total system gain is calculated by: obtaining a plurality of fourth images including gray-scale plates acquired by the image acquisition device; calculating a mean and a variance of original pixel values of respective fourth images for each pixel; performing a linear fitting on means and variances corresponding to respective pixels by taking the mean as an abscissa and the variance as an ordinate to obtain a target line; determining a slope of the target line as the total system gain.

Optionally, generating original pixel values of a target image which corresponds to the first image for which the ambient light brightness is less than the second preset brightness threshold based on respective third pixel value, comprises: obtaining a fourth pixel value of each pixel by adding read-in noise and/or row noise on the basis of the third pixel value of this pixel; obtaining original pixel values of the target image which corresponds to the first image for which the ambient light brightness is less than the second preset brightness threshold based on respective fourth pixel values.

Optionally, the read-in noise conforms to a first Gaussian distribution, a mean of the first Gaussian distribution is 0, and a variance of the first Gaussian distribution is a square root of a value of the ordinate when the abscissa in the target line is 0; the row noise conforms to a second Gaussian distribution, a mean of the second Gaussian distribution is 0, and a variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

Optionally, after generating original pixel values of a target image which corresponds to the first image for which the ambient light brightness is less than the second preset brightness threshold based on respective third pixel values, the method further comprises: training an image enhancement network model to be trained until it converges to obtain an image enhancement network model by taking original pixel values of the target image as input data and the first pixel values as corresponding output data.

Optionally, the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

Optionally, obtaining a first pixel value of each pixel in a first image based on original pixel values of the first image acquired by an image acquisition device when ambient light brightness is greater than a first preset brightness threshold, comprises: obtaining pixel values of respective pixels in RAW data of the first image acquired by the image acquisition device when the ambient light brightness is greater than the first preset brightness threshold as to-be-processed pixel values; obtaining the first pixel value of each pixel in the first image by subtracting a black level value of the image acquisition device from each of the to-be-processed pixel values.

In a second aspect, in order to achieve the above object, an embodiment of the present application discloses an apparatus for generating image data. The apparatus comprises: a first pixel value obtaining module, configured for obtain a first pixel value of each pixel in a first image based on original pixel values of the first image acquired by an image acquisition device when ambient light brightness is greater than a first preset brightness threshold; a second pixel value obtaining module, configured for obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold; a third pixel value obtaining module, configured for obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; and an image data generation module, configured for generating original pixel values of a target image which corresponds to the first image for which the ambient light brightness is less than the second preset brightness threshold based on respective third pixel values.

Optionally, the third pixel value obtaining module comprises: a first charge number obtaining sub-module, configured for obtaining a number of charges corresponding to each pixel as a first charge number by dividing the second pixel value of this pixel by the total system gain of the image acquisition device; a second charge number obtaining sub-module, configured for obtaining a second charge number corresponding to this pixel by adding Poisson noise on the basis of the first charge number corresponding to this pixel; and a third pixel value obtaining sub-module, configured for obtaining the third pixel value of this pixel by multiplying the second charge number corresponding to this pixel by the total system gain.

Optionally, the apparatus further comprises: a fourth image obtaining module, configured for obtaining a plurality of fourth images including gray-scale plates acquired by the image acquisition device; a calculation module, configured for calculating a mean and a variance of original pixel values of respective fourth images for each pixel; a linear fitting module, configured for performing a linear fitting on means and variances corresponding to respective pixels by taking the mean as an abscissa and the variance as an ordinate to obtain a target line; and a total system gain determination module, configured for determining a slope of the target line as the total system gain.

Optionally, the image data generation module comprises: a fourth pixel value obtaining sub-module, configured for obtaining a fourth pixel value of each pixel by adding read-in noise and/or row noise on the basis of the third pixel value of this pixel; and an image data generation sub-module, configured for obtaining original pixel values of the target image which corresponds to the first image for which the ambient light brightness is less than the second preset brightness threshold based on respective fourth pixel values.

Optionally, the read-in noise conforms to a first Gaussian distribution, a mean of the first Gaussian distribution is 0, and a variance of the first Gaussian distribution is a square root of a numerical value of the ordinate when the abscissa in the target line is 0; the row noise conforms to a second Gaussian distribution, a mean of the second Gaussian distribution is 0, and a variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

Optionally, the apparatus further comprises: a training module, configured for training, after generating original pixel values of a target image which corresponds to the first image for which the ambient light brightness is less than the second preset brightness threshold based on respective third pixel values, an image enhancement network model to be trained until it converges to obtain an image enhancement network model by taking original pixel values of the target image as input data and the first pixel values as corresponding output data.

Optionally, the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

Optionally, the first pixel value obtaining module comprises: a to-be-processed pixel values obtaining sub-module, configured for obtaining pixel values of respective pixels in RAW data of the first image acquired by the image acquisition device when the ambient light brightness is greater than the first preset brightness threshold as to-be-processed pixel values; and a first pixel value obtaining sub-module, configured for obtaining the first pixel value of each pixel in the first image by subtracting a black level value of the image acquisition device from each of the to-be-processed pixel values.

In a third aspect, in order to achieve the above object, an embodiment of the present application further discloses an electronic device comprising a processor, a communication interface, a memory and a communication bus, wherein the processor, the communication interface and the memory communicate with each other via the communication bus; a computer program is stored in the memory; the processor performs the method for generating image data as described in the first aspect above when executing the program stored on the memory.

In a fourth aspect, in order to achieve the above object, an embodiment of the present application also discloses a computer readable storage medium, wherein a computer program is stored in the computer readable storage medium, which, when executed by a processor, cause the processor to perform the method for generating image data as described in the first aspect above.

In a fifth aspect, in order to achieve the above object, an embodiment of the present invention discloses a computer program product containing instructions which, when run on a computer, cause the computer to perform any one of the method for generating image data as described above.

The beneficial effects of the embodiments of the present application are in that:

the method for generating image data provided by the embodiments of the present application may obtain a first pixel value of each pixel in a first image based on original pixel values of the first image acquired by an image acquisition device when ambient light brightness is greater than a first preset brightness threshold; obtain a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold; obtain a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; and generate original pixel values of a target image which corresponds to the first image for which the ambient light brightness is less than the second preset brightness threshold based on respective third pixel values.

The original pixel values of the generated target image is obtained by dividing the original pixel values of the first image by a preset multiple, that is, the original pixel values of the target image may represent an image when ambient light brightness is low. In addition, the original pixel values of the target image is obtained by adding Poisson noise, so that the original pixel values of the target image may effectively simulate the noise in the image acquired by the image acquisition device. Therefore, the method for generating image data provided by the embodiments of the present application may automatically generate image data of an image under insufficient ambient light brightness corresponding to an image under sufficient ambient light brightness. Compared with the prior art in which the image is acquired manually through the image acquisition device when the ambient light brightness is insufficient, the generation efficiency of image data may be improved. It should be understood that any product or method for implementing the embodiments of the present disclosure does not necessarily require all of the advantages described above.

BRIEF DESCRIPTION OF DRAWINGS

In order to more clearly describe the technical solution of the embodiments of the present application and the prior art, drawings needed in the embodiments and the prior art will be briefly described below. Obviously, the drawings described below are for only some embodiments of the present application, one of ordinary skills in the art may also obtain other drawings based on the drawings illustrated herein.

DETAILED DESCRIPTION

In order to make objectives, technical solutions and advantages of the present application more clear, the present application now will be described in further detail with reference to the accompanying drawings and by way of examples. Obviously, the embodiments described herein are only some of the embodiments of the present application instead of all of them. All other embodiments obtained by those skilled in the art based on the embodiments in the present application fall within the protection scope of the present application.

In the related art, manually acquiring sample images under conditions of sufficient ambient light brightness and insufficient ambient light brightness through an image acquisition device will reduce the generation efficiency of image data.

In order to solve the above problem, an embodiment of the present application provides a method for generating image data, which may be applied to an electronic device that may obtain original pixel values of a first image acquired by the image acquisition device when the ambient light brightness is greater than a first preset brightness threshold. Further, the electronic device may, based on the method for generating image data provided by the embodiment of the present application, generate original pixel values of a target image which corresponds to the first image for which the ambient light brightness is less than a second preset brightness threshold, that is, the electronic device may directly generate image data corresponding to an image with insufficient ambient light brightness.

Figure 1:
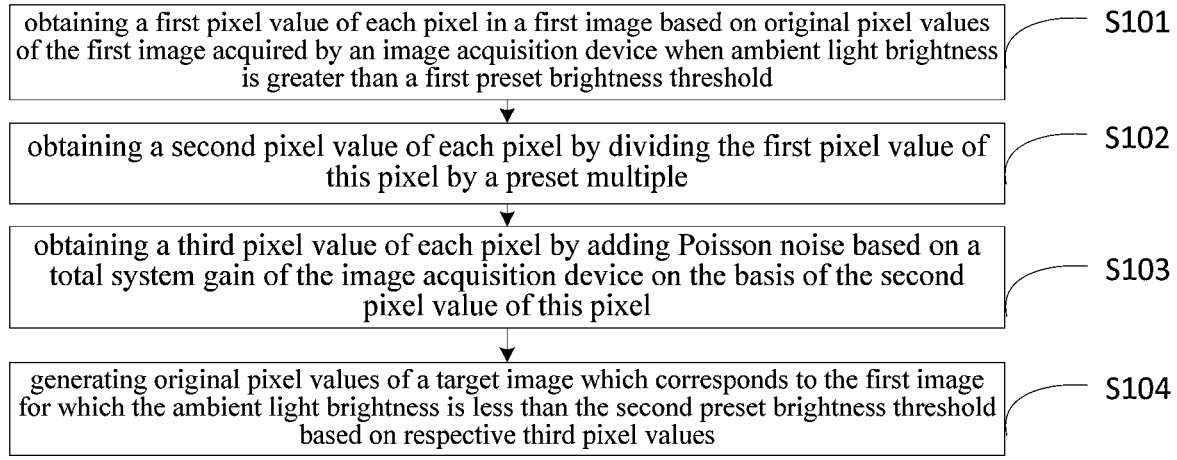
FIG. 1 is a flow diagram of a method for generating image data provided by an embodiment of the present application.

Referring to FIG. 1, which is a flow diagram of a method for generating image data provided by an embodiment of the present application, the method comprises the following steps:

S101: obtaining a first pixel value of each pixel in a first image based on original pixel values of the first image acquired by an image acquisition device when ambient light brightness is greater than a first preset brightness threshold.

S102: obtaining a second pixel value of each pixel by dividing the first pixel value of this pixel by a preset multiple.

Wherein, the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold.

S103: obtaining a third pixel value of each pixel by adding Poisson noise based on a total system gain of the image acquisition device on the basis of the second pixel value of this pixel.

Wherein, the total system gain is determined based on a distribution of original pixel values of a fourth image including a gray-scale plate acquired by the image acquisition device.

S104: generating original pixel values of a target image which corresponds to the first image for which the ambient light brightness is less than the second preset brightness threshold based on respective third pixel values.

According to the method for generating image data provided by the embodiment of the present application, the original pixel values of the generated target image is obtained by dividing the original pixel values of the first image by a preset multiple, that is, the original pixel values of the target image may represent an image with low ambient light brightness. In addition, the original pixel values of the target image is obtained by adding Poisson noise, so that the original pixel values of the target image may effectively simulate the noise in the image acquired by the image acquisition device. Therefore, the method for generating image data provided by the embodiment of the present application can automatically generate image data of an image with insufficient ambient light brightness corresponding to an image with sufficient ambient light brightness. Compared with the prior art in which an image when the ambient light brightness is insufficient is manually acquired by an image acquisition device, the present application can improve the generation efficiency of image data.

For step S101, the first preset brightness threshold may be set by technicians according to experience. For example, the first preset brightness threshold may be 25 lux or 30 lux. If the ambient light brightness is greater than the first preset brightness threshold, it is indicated that the current ambient light brightness is sufficient.

In an implementation, the original pixel values of the image may be pixel values recorded in the RAW data of the image acquired by the image acquisition device. That is, a CMOS (Complementary Metal Oxide Semiconductor) or CCD (Charge Coupled Device) image sensor of the image acquisition device converts the captured light source signal into raw data of a digital signal.

In an implementation, the original pixel value of the first image acquired by the image acquisition device may be directly used as the first pixel value of each pixel in the first image.

Figure 2:
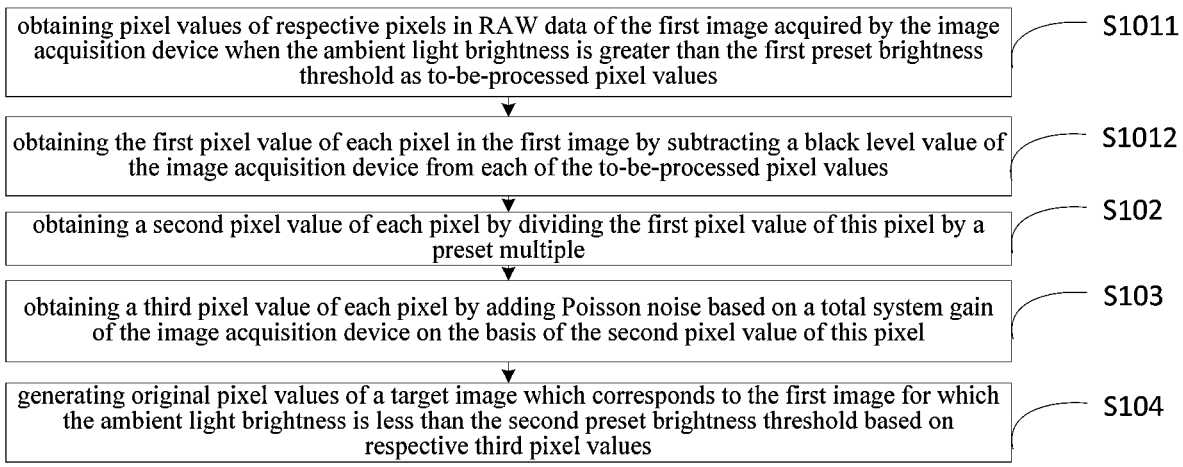
FIG. 2 is a flow diagram of another method for generating image data provided by an embodiment of the present application.

In another implementation, referring to FIG. 2 and on the basis of FIG. 1, the above-mentioned step S101 may comprise the following steps:

S1011: obtaining pixel values of respective pixels in RAW data of the first image acquired by the image acquisition device when the ambient light brightness is greater than the first preset brightness threshold as to-be-processed pixel values.

S1012: obtaining the first pixel value of each pixel in the first image by subtracting a black level value of the image acquisition device from each of the to-be-processed pixel values.

In the embodiment of the present application, when the image acquisition device converts the light source signal into the original data of the digital signal, an offset value is usually added, and the offset value is the black level value of the image acquisition device. Therefore, in order to improve the accuracy of the obtained first pixel value, the black level value may be subtracted from the to-be-processed pixel values. In addition, if one to-be-processed pixel value is negative after subtracting the black level value, it may be determined that the corresponding first pixel value is 0.

For step S102, the preset second brightness threshold may be set by technicians according to experience. For example, the second preset brightness threshold may be 0.1 lux or 0.2 lux. If the ambient light brightness is less than the preset second brightness threshold, it is indicated that the current ambient light brightness is insufficient.

In one embodiment, the image acquisition device may be used in advance to acquire a plurality of images when the ambient light brightness is greater than the first preset brightness threshold to obtain a second image, and acquire a plurality of images when the ambient light brightness is less than the second preset brightness threshold to obtain a third image.

Then, an average value of the original pixel values of the plurality of second images (which may be referred to as a first average value), and an average value of the original pixel values of the plurality of third images (which may be referred to as a second average value) may be calculated. Furthermore, the ratio of the first average value to the second average value may be calculated as a preset multiple.

Dividing the first pixel value by the preset multiple to obtain the second pixel value enables the second pixel value to reflect the image acquired when the ambient light brightness is less than the second preset brightness threshold, that is, can reflect the image acquired when the ambient light brightness is insufficient.

For the above step S103, in the process of converting the captured light source signal into the original data of digital signal, the product of photoelectrically converted charge number corresponding to each pixel and the total system gain may be calculated as the original pixel value of the pixel.

Figure 3:
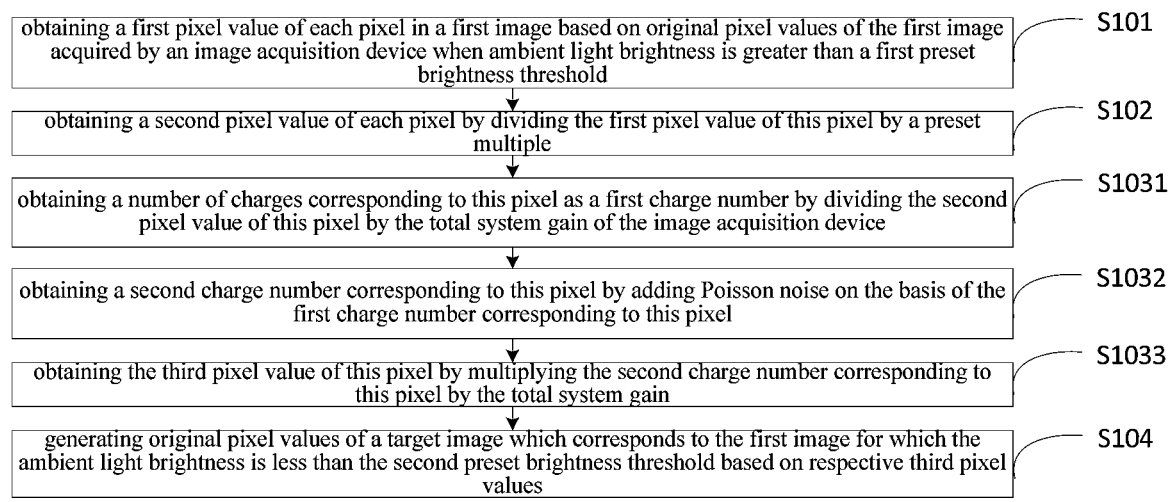
FIG. 3 is a flow diagram of yet another method for generating image data provided by an embodiment of the present application.

In one embodiment, Poisson noise may be added based on the charge number corresponding to each pixel. Referring to FIG. 3 and on the basis of FIG. 1, the above-mentioned step S103 may comprise the following steps:

S1031: obtaining a number of charges corresponding to each pixel as a first charge number by dividing the second pixel value of this pixel by the total system gain of the image acquisition device;

S1032: obtaining a second charge number corresponding to this pixel by adding Poisson noise on the basis of the first charge number corresponding to this pixel;

S1033: obtaining the third pixel value of this pixel by multiplying the second charge number corresponding to this pixel by the total system gain.

In the embodiment of the present application, for each pixel, the Poisson distribution may be determined which takes the first charge number corresponding to the pixel as a mean and a variance, that is, the mean and the variance of the determined Poisson distribution are both the first charge number. Furthermore, a value conforming to the Poisson distribution may be generated as the second charge number, that is, the charge number corresponding to the pixel after adding Poisson noise. For example, a plurality of values conforming to the Poisson distribution may be randomly generated, of which one may be selected as the second charge number. Alternatively, one value conforming to the Poisson distribution may be randomly generated as the second charge number.

Figure 4:
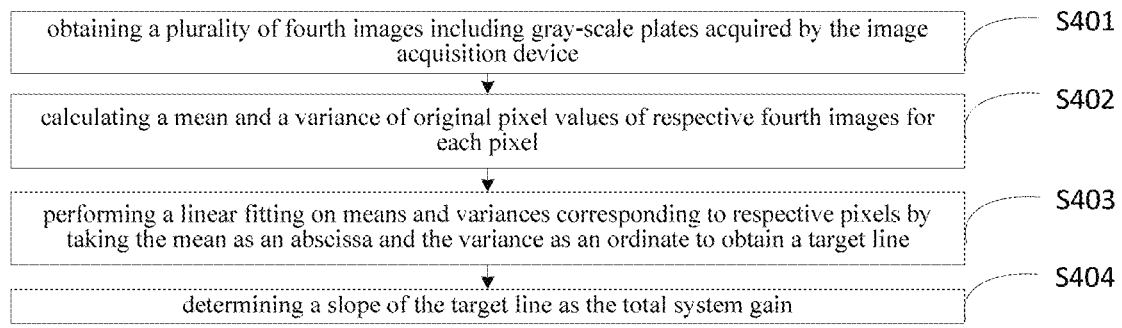
FIG. 4 is a flow diagram of a method for calculating a total system gain provided by an embodiment of the present application.

In one embodiment, referring to FIG. 4, which is a flow diagram of a method for calculating a total system gain provided by an embodiment of the present application, the method comprises the following steps:

S401: obtaining a plurality of fourth images including gray-scale plates acquired by the image acquisition device.

S402: calculating a mean and a variance of original pixel values of respective fourth images for each pixel.

S403: performing a linear fitting on means and variances corresponding to respective pixels by taking the mean as an abscissa and the variance as an ordinate to obtain a target line.

S404: determining a slope of the target line as the total system gain.

Figure 5:
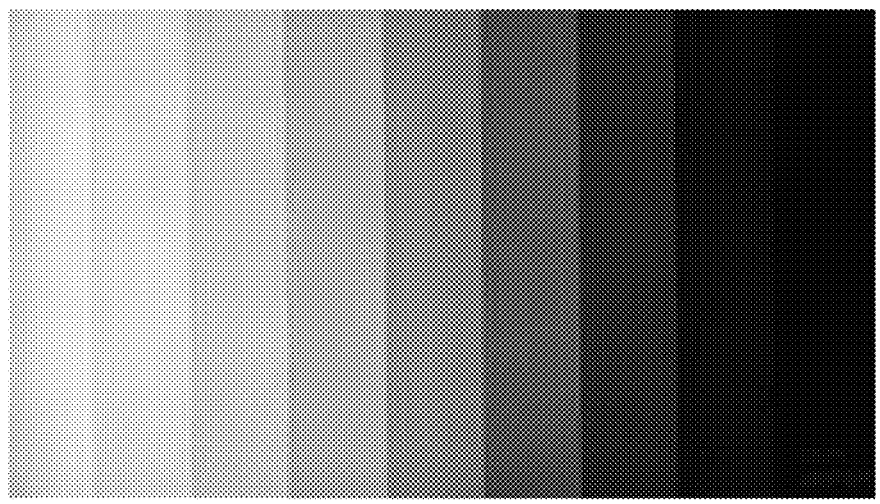
FIG. 5 is a schematic diagram of a gray-scale plate provided by an embodiment of the present application.

Wherein, the surface of the gray-scale plates is a gray-scale image with pixel value gradient, for example, see FIG. 5.

In the embodiment of the present application, a plurality of (e.g., 100) images containing the gray-scale plates (i.e., the fourth image) may be photographed by the image acquisition device under the preset ambient light brightness in advance. In addition, in the process of photographing, the whitest position of the gray-scale board is not overexposed.

Then, the original pixel values of respective fourth images can be obtained. Furthermore, for each pixel, the original pixel value of the pixel in each fourth image is obtained and the corresponding mean and variance thereof are determined. That is to say, for each pixel, the mean and variance of its corresponding original pixel value may be determined. See formula (1).

$$\begin{cases} E(x) = \overline{x} \\ \text{Var}(x) = K\overline{x} + \delta_{read}^2 \end{cases} \quad (1)$$

wherein, E(x) represents the mean of the pixel values corresponding to the pixel, Var(x) represents the variance of the pixel values corresponding to the pixel, K represents the slope of the target line, $\delta_{read}^2$ represents the value of the ordinate (i.e. variance) when the abscissa (i.e. mean) in the target line is 0.

Figure 6:
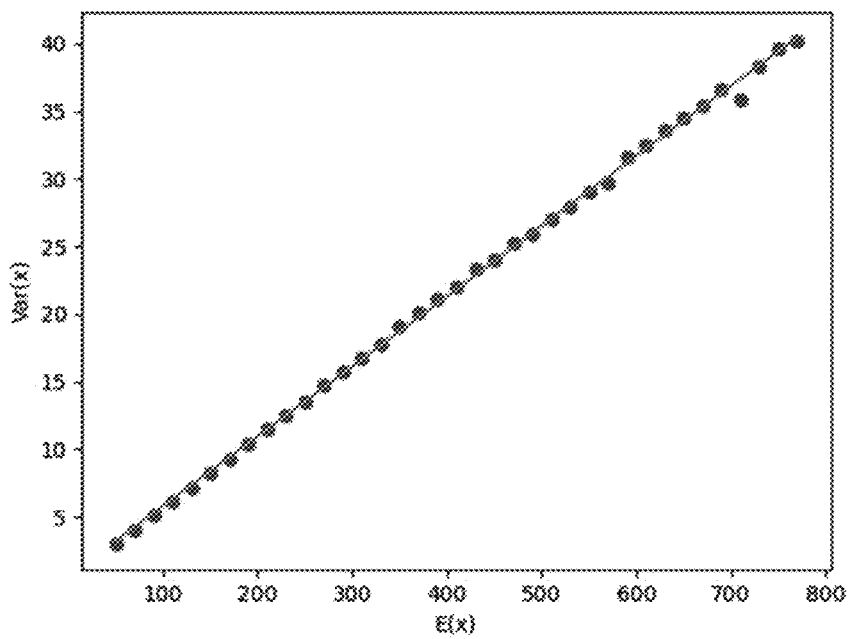
FIG. 6 is a schematic diagram of a target line provided by an embodiment of the present application.

Referring to FIG. 6, it is a schematic diagram of a target line provided by an embodiment of the present application. In FIG. 6, the abscissa represents a mean of pixel values corresponding to respective pixels, and the ordinate represents a variance of the pixel values corresponding to the respective pixels. According to the mean and variance of the pixel values corresponding to respective pixels, respective points in FIG. 6 may be determined, and further the line obtained by fitting respective points in FIG. 6 may be determined.

In one embodiment, other noises may be added on the basis of adding Poisson noise in order to further improve the reality of the generated image data.

Accordingly, the above step of S104 may comprise the following steps:

Step one: obtaining a fourth pixel value of each pixel by adding read-in noise and/or row noise on the basis of the third pixel value of this pixel.

Step two: obtaining original pixel values of the target image which corresponds to the first image for which the ambient light brightness is less than the second preset brightness threshold based on respective fourth pixel values.

In the embodiment of the present application, on the basis of obtaining the third pixel value, that is, after adding Poisson noise, read-in noise and/or row noise may also be added to obtain the fourth pixel value.

Wherein, the read-in noise represents image noise caused by dark current noise, thermal noise, source follower noise, etc. For each pixel, the corresponding read-in noise conforms to a Gaussian distribution (i.e. the first Gaussian distribution in the following).

For example, m×n values conforming to the first Gaussian distribution may be generated, wherein m represents a width of the first image and n represents a height of the first image. The generated m×n values correspond to respective pixels. Furthermore, the generated m×n values may be added to the third pixel value of the corresponding pixel, to obtain the fourth pixel value.

The row noise refers to noise generated when data is read out by a CMOS image sensor in units of row pixels. The row noise corresponding to each row pixel is the same, and the row noises corresponding to respective row pixels conform to a Gaussian distribution (i.e. the second Gaussian distribution in the following).

For example, n values conforming to the second Gaussian distribution may be generated, wherein n represents the height of the first image. The generated n values correspond to respective row pixels. For one row pixel, the third pixel value corresponding to the row pixel may be added with the generated corresponding value to obtain the fourth pixel value.

In one embodiment, the above-mentioned read-in noise conforms to a first Gaussian distribution, a mean of the first Gaussian distribution is 0, and a variance of the first Gaussian distribution is a square root of a value of the ordinate when the abscissa in the target line is 0, i.e. $\delta_{read}$ in the above formula (1).

The row noise conforms to a second Gaussian distribution, the mean of the second Gaussian distribution is 0, and the variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

In the embodiment of the present application, original pixel values of the image (i.e. the fifth image) acquired by the image acquisition device when the exposure time is 0 and the incident light intensity is 0 may be obtained. The fifth image is the Bias Frame acquired by the image acquisition device. For example, the lens of the image acquisition device may be covered and the exposure time is set to 0 for image acquiring, and the acquired image is the fifth image.

After the original pixel values of the fifth image are obtained, for each row pixel, a mean of the original pixel values in the fifth image corresponding to the row pixel may be calculated. However, a standard deviation of respective means corresponding to respective row pixels may be calculated as the variance of the second Gaussian distribution.

In an implementation, after adding read-in noise and/or row noise to obtain the fourth pixel value, the fourth pixel value may be directly used as the original pixel value of the target image which corresponds to the first image for which the ambient light brightness is less than the second preset brightness threshold.

In another implementation, after the fourth pixel value is obtained, quantization noise may be added on the basis of the fourth pixel value. The quantization noise may be determined based on the number of bits of the original pixel value of the image acquired by the image acquisition device. For example, the quantization noise may be $$\frac{1}{2^L - 1},$$

wherein L represents the number of bits of the original pixel values of the image acquired by the image acquisition device.

For example, the original pixel values of the image acquired by the image acquisition device is 12 bits, that is, the range of the pixel value of each pixel is 0 to $2^L - 1$ (i.e. 4095). Accordingly, the quantization noise may be 1/4095, which means that 1/4095 is added respectively to each of fourth pixel values to obtain the original pixel values of the target image which corresponds to the first image for which the ambient light brightness is less than the second preset brightness threshold.

In one embodiment, after obtaining the original pixel values of the target image, the image enhancement network model can also be trained based on the original pixel values of the first image and the original pixel values of the target image.

Figure 7:
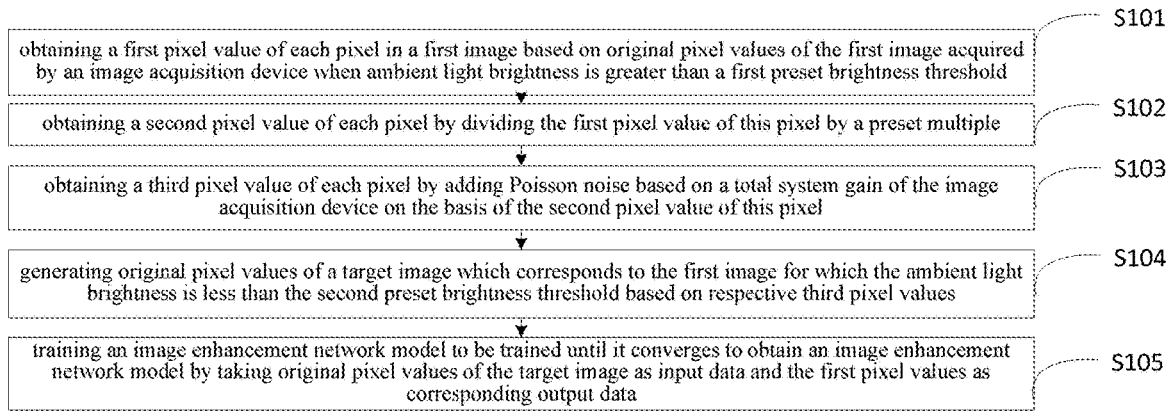
FIG. 7 is a flow diagram of another method for generating image data provided by an embodiment of the present application.

Accordingly, referring to FIG. 7 and on the basis of FIG. 1, after the above step of S104, the method can also comprise the following steps:

S105: training an image enhancement network model to be trained until it converges to obtain an image enhancement network model by taking original pixel values of the target image as input data and the first pixel values as corresponding output data.

Based on the above processing, the image enhancement network model can learn the conversion relationship from the target image to the first image. Accordingly, for the original pixel values of the image acquired when the input ambient light is insufficient, the image enhancement network model can remove the noise therein to obtain original pixel values of a clear image, that is, the corresponding image data of the image when the ambient light is sufficient can be obtained.

In one embodiment, the above-mentioned image enhancement network model may be U-net.

In one embodiment, the traditional U-net can also be improved to obtain the above-mentioned image enhancement network model.

In an implementation, the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

Figure 8:
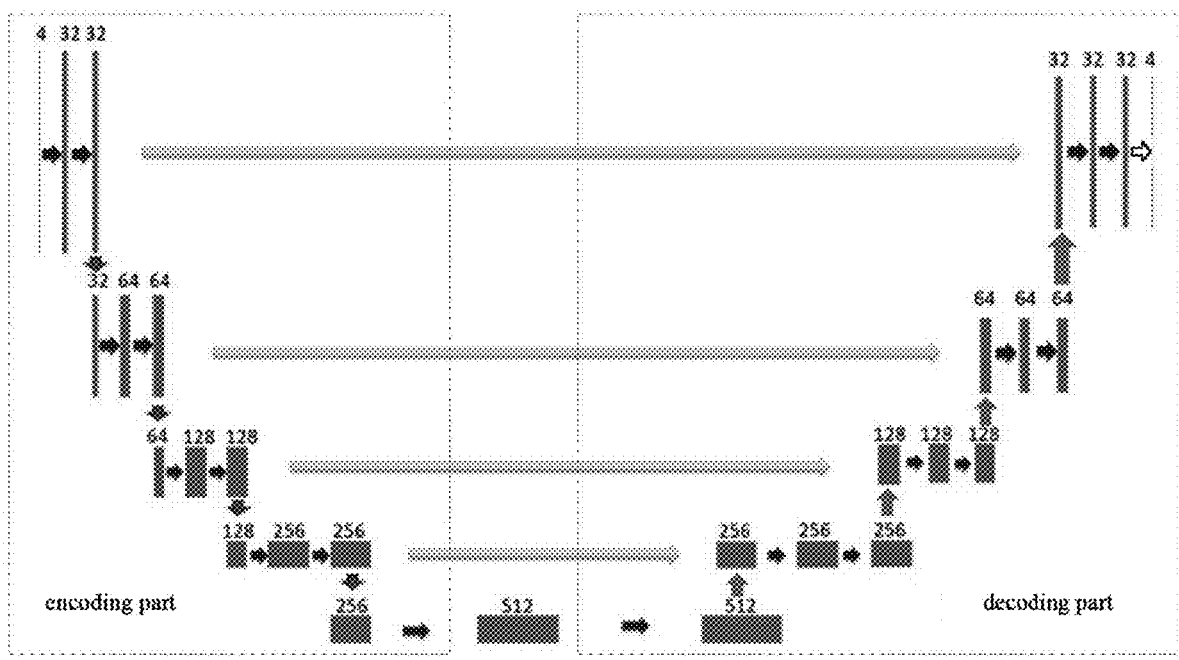
FIG. 8 is a structural diagram of an image enhancement network model provided by an embodiment of the present application.

Referring to FIG. 8, it is a structural diagram of an image enhancement network model provided by an embodiment of the present application.

The image enhancement network model in FIG. 8 may be divided into the encoding part on the left and the decoding part on the right.

The encoding part comprises a plurality of network layers, while the decoding part comprises a plurality of network layers. The number of network layers contained in both of the encoding part and the decoding part is the same. In the embodiment of the present application, only an example in which both of them include 5 network layers is used for description, but it is not limited to this.

The number in FIG. 8 represents the number of channels, the solid arrows pointing to the right in the encoding part and the decoding part represent convolution, of which the size of the convolution kernel is 3×3; the solid arrows pointing down represent max pooling, of which the size of the pooling window is 2×2; the solid arrows pointing up represent transposed convolution, of which the size of the convolution kernel is 2×2, the transposed convolution is also called up-sampling processing; the hollow arrows pointing to the right represents convolution, of which the size of convolution kernel is 1×1. The arrows between the encoding part and the decoding part represent superimposition processing.

In FIG. 8, in the encoding part and the decoding part, the network layers can be referred to as the first network layer, the second network layer, the third network layer, the fourth network layer, and the fifth network layer, respectively, from top to bottom.

In FIG. 8, the input data is 4-channel data, while the output data is also 4-channel data. The data of each channel may be called a feature map.

It can be seen that the input data of the first network layer of the encoding part in FIG. 8 is a 4-channel feature map. After processing by the first network layer, a 32-channel feature map can be obtained; after processing by the second network layer of the encoding part, a 64-channel feature map can be obtained; after processing by the third network layer of the encoding part, a 128-channel feature map can be obtained; after processing by the fourth network layer of the encoding part, a 256-channel feature map can be obtained; after processing by the fifth network layer of the encoding part, a 512-channel feature map can be obtained.

The input data of the fifth network layer of the decoding part is a 512-channel feature map. After processing by the fifth network layer, a 512-channel feature map can be obtained. After the 512-channel feature map is up-sampled, the 256-channel feature map can be obtained and superimposed with a 256-channel feature map obtained from the fourth network layer of the encoding part, and the superimposed result is still a 256-channel feature map. Then, the 256-channel feature map obtained by superposition can be input to the fourth network layer of the decoding part to obtain a 256-channel feature map. The 256-channel feature map output by the fourth network layer of the decoding part is up-sampled to obtain a 128-channel feature map, the 128-channel feature map is superimposed with a 128-channel feature map obtained by the third network layer of the encoding part, and the superimposed result is still a 128-channel feature map, which is input to the third network layer of the decoding part.

By analogy, the input data of the first network layer of the decoding part is obtained by superimposing a 32-channel feature map obtained by up-sampling a 64-channel feature map output by the second network layer of the decoding part with a 32-channel feature map output by the first network layer of the encoding part. The first network layer of the decoding part outputs a 4-channel feature map.

For example, the original pixel values of the target image can be unpacked into a 4-channel feature map, that is, a RGGB (red green green blue)-channel feature map, as the input data of the image enhancement network model shown in FIG. 8. At the same time, the first pixel value can also be unpacked into a 4-channel feature map as the corresponding output data in order to train the image enhancement network model shown in FIG. 8.

Furthermore, when image enhancement processing is required for a certain image (a to-be-processed image), the original pixel values of the to-be-processed image can be unpacked into a 4-channel feature map and then input to the trained image enhancement network model. Furthermore, a 4-channel feature map output by the image enhancement network model can be obtained. The output 4-channel feature map can be packed to obtain the original pixel values after enhancement processing.

Figure 9:
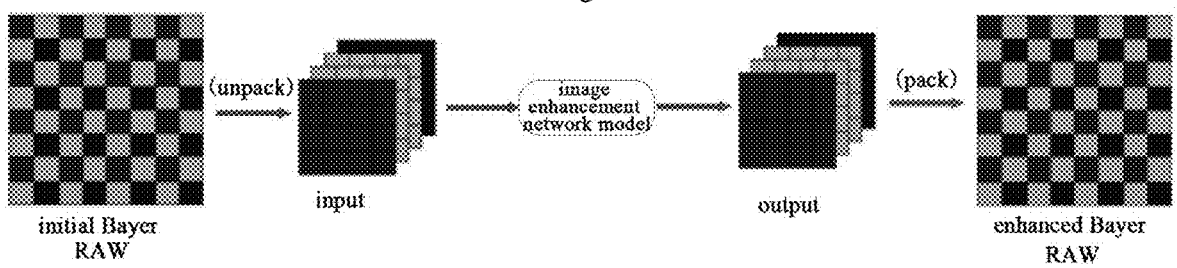
FIG. 9 is a schematic diagram of image enhancement processing based on an image enhancement network model provided by an embodiment of the present application.

Referring to FIG. 9, it is a schematic diagram of image enhancement processing based on the image enhancement network model provided by an embodiment of the present application.

In FIG. 9, the leftmost is initial Bayer RAW, which represents the initial image RAW data. After the data are unpacked, a 4-channel feature map is obtained as the input of the image enhancement network model. Accordingly, the output of the image enhancement network model is a 4-channel feature map. Then, the output 4-channel feature map is packed to obtain enhanced Bayer RAW, i.e., enhanced image Raw data.

The original pixel value, i.e., the pixel value recorded in RAW data, is processed through the preset ISP (Image Signal Processor) to obtain the corresponding image.

Figure 10:
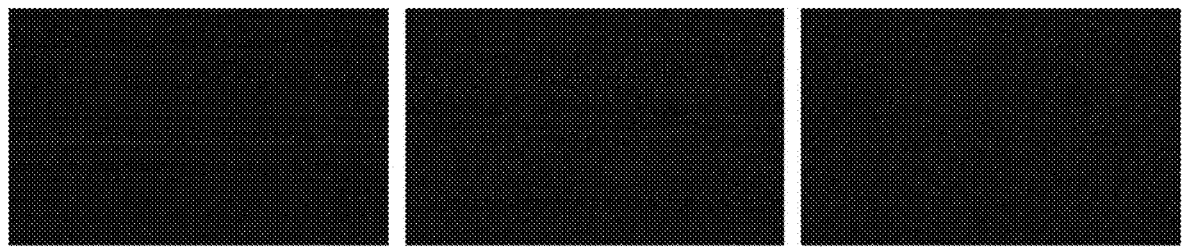
FIG. 10 is a comparison diagram of a result of adding noise provided by an embodiment of the present application.
Figure 11:
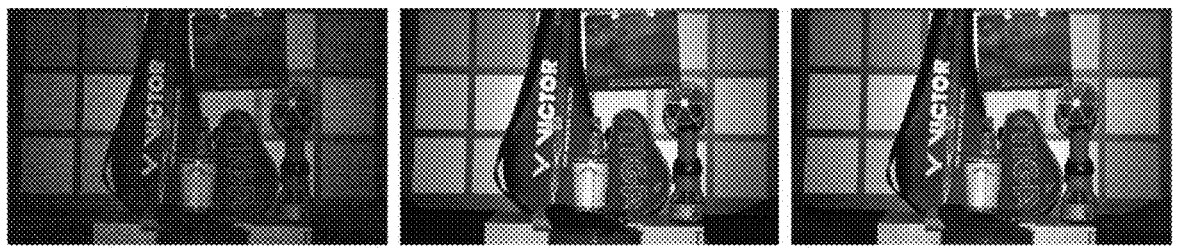
FIG. 11 is a comparison diagram of a result of processing image based on an image enhancement network model provided by an embodiment of the present application.
Figure 12:
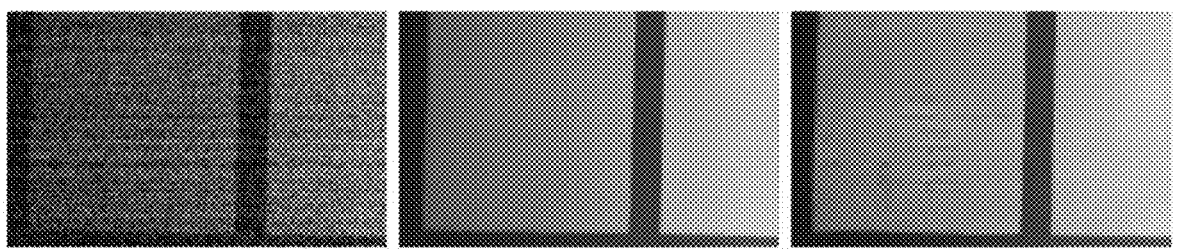
FIG. 12 is a comparison diagram of another result of processing image based on an image enhancement network model provided by an embodiment of the present application.
Figure 13:
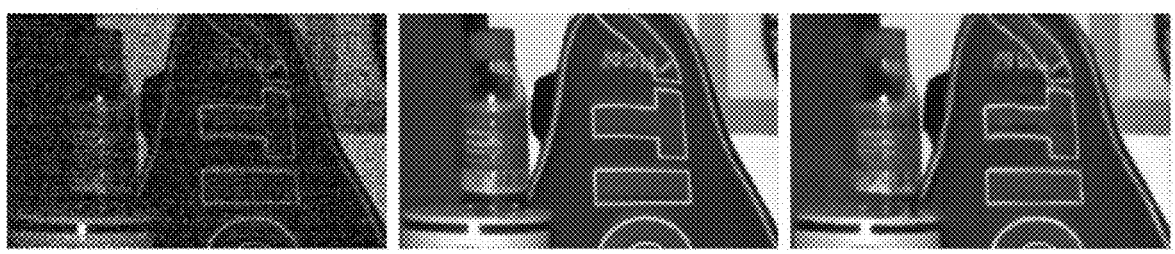
FIG. 13 is a comparison diagram of another result of processing image based on an image enhancement network model provided by an embodiment of the present application.
Figure 14:
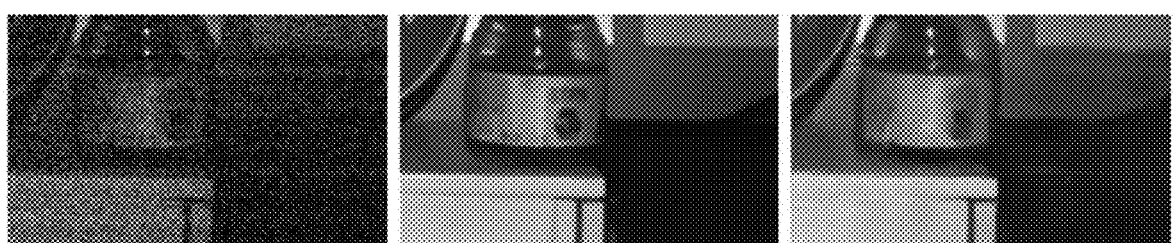
FIG. 14 is a comparison diagram of another result of processing image based on an image enhancement network model provided by an embodiment of the present application.
Figure 15:
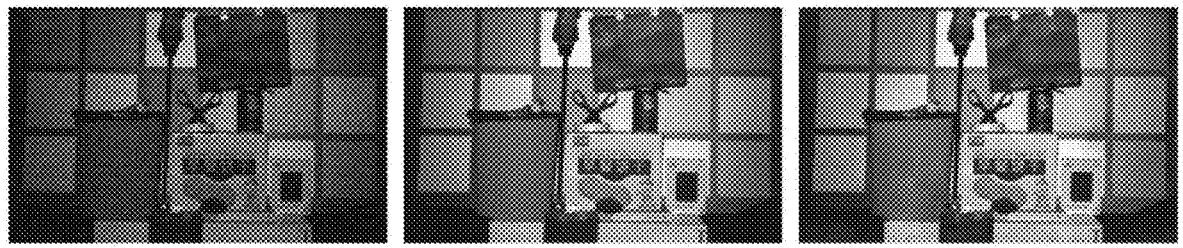
FIG. 15 is a comparison diagram of another result of processing image based on an image enhancement network model provided by an embodiment of the present application.
Figure 16:
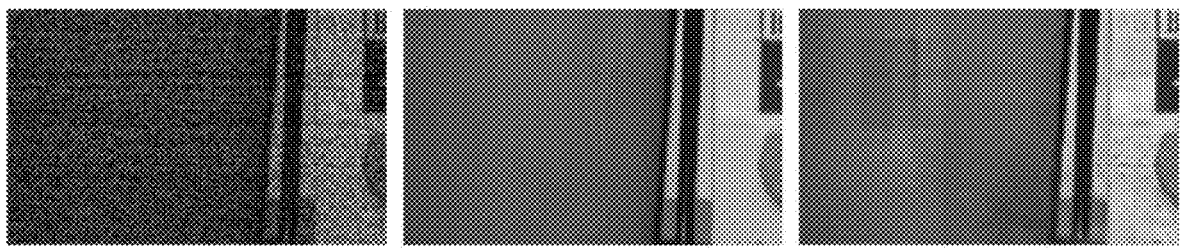
FIG. 16 is a comparison diagram of another result of processing image based on an image enhancement network model provided by an embodiment of the present application.
Figure 17:
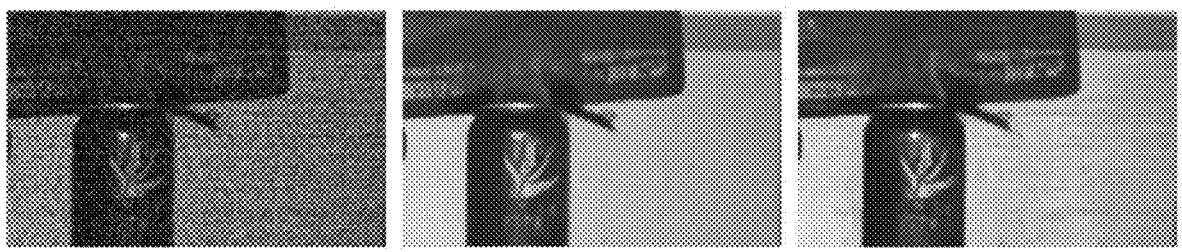
FIG. 17 is a comparison diagram of another result of processing image based on an image enhancement network model provided by an embodiment of the present application.
Figure 18:
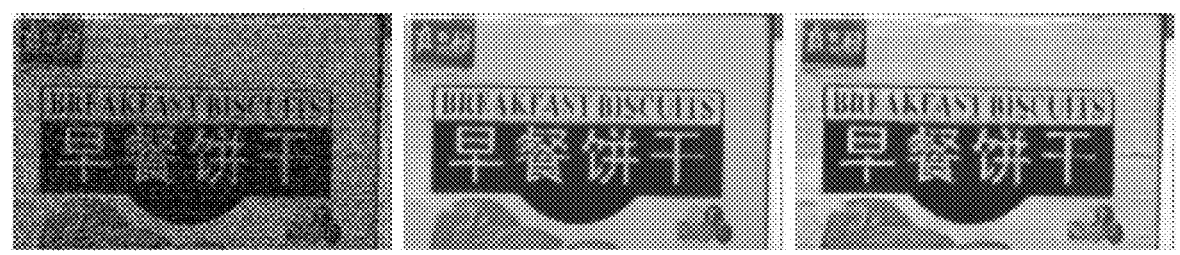
FIG. 18 is a comparison diagram of another result of processing image based on an image enhancement network model provided by an embodiment of the present application.
Figure 19:
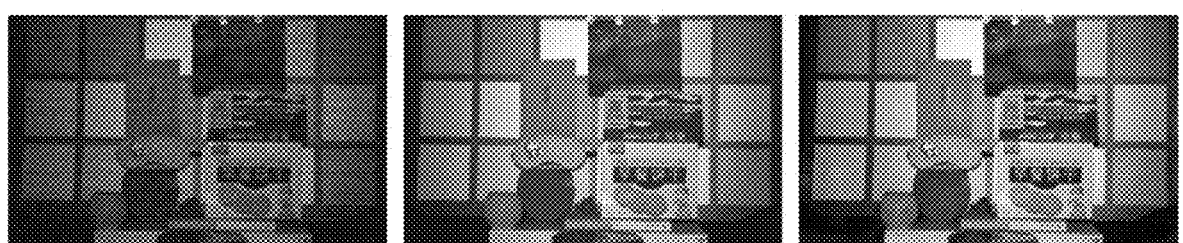
FIG. 19 is a comparison diagram of another result of processing image based on an image enhancement network model provided by an embodiment of the present application.
Figure 20:
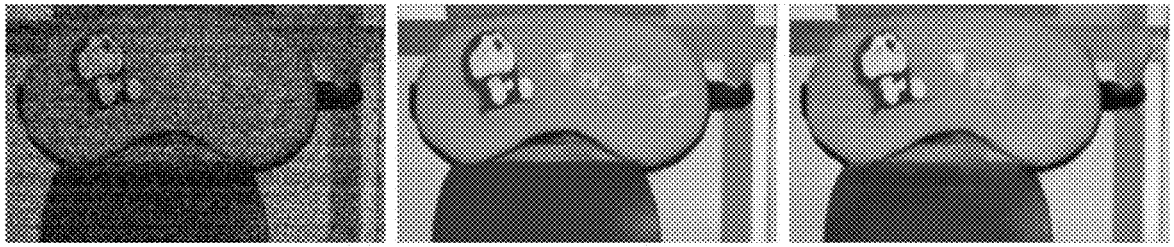
FIG. 20 is a comparison diagram of another result of processing image based on an image enhancement network model provided by an embodiment of the present application.
Figure 21:
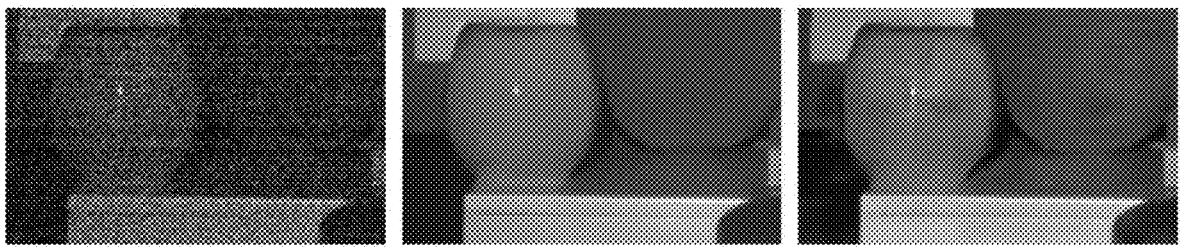
FIG. 21 is a comparison diagram of another result of processing image based on an image enhancement network model provided by an embodiment of the present application.
Figure 22:
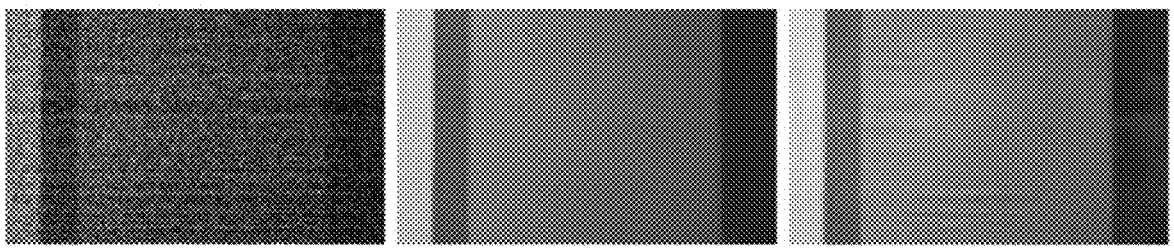
FIG. 22 is a comparison diagram of another result of processing image based on an image enhancement network model provided by an embodiment of the present application.

Referring to FIG. 10, in which the figure on the left represents an image generated through the preset ISP processing of the original pixel values of the Bias Frame acquired by the image acquisition device; the figure in the middle represents an image generated through the preset ISP processing of the pixel values obtained by adding Poisson noise, read-in noise and row noise to the original pixel values which are the black level values based on the method for generating image data provided by the embodiment of the present application; the figure on the right represents an image generated through the preset ISP processing of the pixel values obtained by adding Poisson noise, read-in noise and row noise to the original pixel values which are black level values based on the related art. In the related art, the total system gain when Poisson noise is added, the added read-in noise and the row noise are all empirical values.

It can be seen that compared with the prior art, the image obtained based on the method for generating image data provided by the embodiment of the present application is more similar to the image actually acquired by the image acquisition device, that is, the image data generated based on the method for generating image data provided by the embodiment of the present application can more realistically simulate the image actually acquired by the image acquisition device.

Referring to FIGS. 11-22, each set of figures contain three images. Among the three images in each figure, the figure on the left is an image containing noise acquired when the ambient light is insufficient; the figure in the middle is an image obtained by enhancing the image on the left based on the image enhancement network model provided by the embodiment of the present application; the figure on the right is an image obtained by enhancing the image on the left based on the image enhancement network model in the related art.

Based on the above FIGS. 11-22, it can be seen that compared with the image enhancement network model in the prior art, the image obtained by the enhancement processing of the image enhancement network model provided by the embodiment of the present application has less noise and higher image definition.

Figure 23:
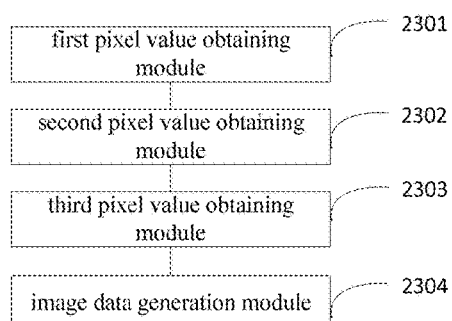
FIG. 23 is a structural diagram of an apparatus for generating image data provided by an embodiment of the present application.

An embodiment of the present application provides an apparatus for generating image data based on the same inventive concept. Referring to FIG. 23, which is a flow diagram of the apparatus for generating image data provided by an embodiment of the present application, the apparatus may comprises: a first pixel value obtaining module 2301, configured for obtain a first pixel value of each pixel in a first image based on original pixel values of the first image acquired by an image acquisition device when ambient light brightness is greater than a first preset brightness threshold; a second pixel value obtaining module 2302, configured for obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold; a third pixel value obtaining module 2303, configured for obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; an image data generation module 2304, configured for generating original pixel values of a target image which corresponds to the first image for which the ambient light brightness is less than the second preset brightness threshold based on respective third pixel values.

Optionally, the third pixel value obtaining module 2303 comprises: a first charge number obtaining sub-module, configured for obtaining a number of charges corresponding to each pixel as a first charge number by dividing the second pixel value of each pixel by the total system gain of the image acquisition device; a second charge number obtaining sub-module, configured for obtaining a second charge number corresponding to this pixel by adding Poisson noise on the basis of the first charge number corresponding to this pixel; a third pixel value obtaining sub-module, configured for obtaining the third pixel value of this pixel by multiplying the second charge number corresponding to this pixel by the total system gain.

Optionally, the apparatus further comprises: a fourth image obtaining module, configured for obtaining a plurality of fourth images including gray-scale plates acquired by the image acquisition device; a calculation module, configured for calculating a mean and a variance of original pixel values of respective fourth images for each pixel; a linear fitting module, configured for performing a linear fitting on means and variances corresponding to respective pixels by taking the mean as an abscissa and the variance as an ordinate to obtain a target line; and a total system gain determination module, configured for determining a slope of the target line as the total system gain.

Optionally, the image data generation module 2304 comprises: a fourth pixel value obtaining sub-module, configured for obtaining a fourth pixel value of each pixel by adding read-in noise and/or row noise on the basis of the third pixel value of this pixel; and an image data generation sub-module, configured for obtaining original pixel values of the target image which corresponds to the first image for which the ambient light brightness is less than the second preset brightness threshold based on respective fourth pixel values.

Optionally, the read-in noise conforms to a first Gaussian distribution, a mean of the first Gaussian distribution is 0, and a variance of the first Gaussian distribution is a square root of a numerical value of the ordinate when the abscissa in the target line is 0; the row noise conforms to a second Gaussian distribution, a mean of the second Gaussian distribution is 0, and a variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

Optionally, the apparatus further comprises: a training module, configured for training, after generating original pixel values of a target image which corresponds to the first image for which the ambient light brightness is less than the second preset brightness threshold based on respective third pixel values, an image enhancement network model to be trained until it converges to obtain an image enhancement network model by taking original pixel values of the target image as input data and the first pixel values as corresponding output data.

Optionally, the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

Optionally, the first pixel value obtaining module 2301 comprises: a to-be-processed pixel values obtaining sub-module, configured for obtaining pixel values of respective pixels in RAW data of the first image acquired by the image acquisition device when the ambient light brightness is greater than the first preset brightness threshold as to-be-processed pixel values; and a first pixel value obtaining sub-module, configured for obtaining the first pixel value of each pixel in the first image by subtracting a black level value of the image acquisition device from each of the to-be-processed pixel values.

Figure 24:
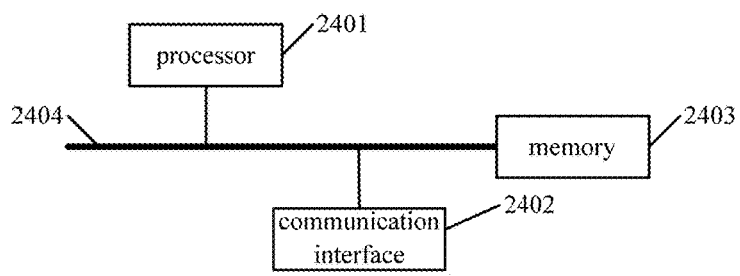
FIG. 24 is a structural diagram of an electronic device provided by an embodiment of the present application.

An embodiment of the present application provides an electronic device, as shown in FIG. 24, which comprises a processor 2401, a communication interface 2402, a memory 2403 and a communication bus 2404, wherein the processor 2401, the communication interface 2402 and the memory 2403 communicate with each other via the communication bus 2404, a computer program is stored in the memory 2403; the processor 2401 performs the following steps when executing the program stored on the memory 2403; obtaining a first pixel value of each pixel in a first image based on original pixel values of the first image acquired by an image acquisition device when ambient light brightness is greater than a first preset brightness threshold; obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold; obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; generating original pixel values of a target image which corresponds to the first image for which the ambient light brightness is less than the second preset brightness threshold based on respective third pixel values.

The communication bus aforementioned in the electronic device may be a peripheral component interconnect (PCI) bus or an extended industry standard architecture (EISA) bus and the like. The communication bus may include an address bus, a data bus, a control bus, or the like. For representation, only one thick line is shown in the figure, which does not mean there is only one communication bus or one type of communication bus.

The communications interface is used for communication between the aforementioned electronic device; and other devices.

The memory may include a random access memory (RAM), or may include a non-volatile memory (NVM), for example at least one disk memory. Optionally, the memory may also be at least one storage device located away from the processor described above.

The aforementioned processor may be a general-purpose processor, such as a central processing unit (CPU), a network processor (NP), or the like; it may also be a digital signal processor (DSP), an application specific integrated circuit (ASIC), a field-programmable gate array (FPGA) or other programmable logic device, a discrete gate or transistor logic device, a discrete hardware component.

In another embodiment of the present application, there is provided a computer readable storage medium, wherein a computer program is stored in the computer readable storage medium, which, when executed by a processor, cause the processor to perform steps of any one of the method described above.

In still another embodiment of the present application, there is also provided a computer program product containing instructions which, when run on a computer, cause the computer to perform the method for generating image data described in any one of the embodiments described above.

In the aforementioned embodiments, it may be implemented in whole or in part by software, hardware, firmware, or any combination thereof. When implemented by software, it may be implemented in whole or in part in the form of a computer program product. The computer program product comprises one or more computer instructions. The processes or functions described in accordance with the embodiments of the present application is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations.

Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments may be referred to one another, and the parts emphasized are differences to other embodiments. It should be noted that, for embodiments of the apparatus, electronic device, computer readable storage medium and computer program product, since they are substantially similar to the embodiments of the method, their description is relatively simple, and for the related aspects, one only needs to refer to portions of the description of the embodiments of the method.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A method for generating image data, wherein the method comprises:
    obtaining a first pixel value of each pixel in a first image based on original pixel values of the first image acquired by an image acquisition device when ambient light brightness is greater than a first preset brightness threshold;
    obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold;
    obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device;
    generating original pixel values of a target image which corresponds to the first image for which the ambient light brightness is less than the second preset brightness threshold based on respective third pixel values.

2. The method of claim 1, wherein, obtaining a third pixel value of each pixel by adding Poisson noise based on a total system gain of the image acquisition device on the basis of the second pixel value of this pixel, comprises:
    obtaining a number of charges corresponding to each pixel as a first charge number by dividing the second pixel value of this pixel by the total system gain of the image acquisition device;
    obtaining a second charge number corresponding to this pixel by adding Poisson noise on the basis of the first charge number corresponding to this pixel;

obtaining the third pixel value of this pixel by multiplying the second charge number corresponding to this pixel by the total system gain.

3. The method of claim 1, wherein the total system gain is calculated by:
  obtaining a plurality of fourth images including gray-scale plates acquired by the image acquisition device;
  calculating a mean and a variance of original pixel values of respective fourth images for each pixel;
  performing a linear fitting on means and variances corresponding to respective pixels by taking the mean as an abscissa and the variance as an ordinate to obtain a target line;
  determining a slope of the target line as the total system gain.

4. The method of claim 3, wherein generating original pixel values of a target image which corresponds to the first image for which the ambient light brightness is less than the second preset brightness threshold based on respective third pixel value, comprises:
  obtaining a fourth pixel value of each pixel by adding read-in noise and/or row noise on the basis of the third pixel value of this pixel;
  obtaining original pixel values of the target image which corresponds to the first image for which the ambient light brightness is less than the second preset brightness threshold based on respective fourth pixel values.

5. The method of claim 4, wherein the read-in noise conforms to a first Gaussian distribution, a mean of the first Gaussian distribution is 0, and a variance of the first Gaussian distribution is a square root of a value of the ordinate when the abscissa in the target line is 0;
  the row noise conforms to a second Gaussian distribution, a mean of the second Gaussian distribution is 0, and a variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

6. The method of claim 1, wherein after generating original pixel values of a target image which corresponds to the first image for which the ambient light brightness is less than the second preset brightness threshold based on respective third pixel values, the method further comprises:
  training an image enhancement network model to be trained until it converges to obtain an image enhancement network model by taking original pixel values of the target image as input data and the first pixel values as corresponding output data.

7. The method of claim 6, wherein the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

8. The method of claim 1, wherein obtaining a first pixel value of each pixel in a first image based on original pixel values of the first image acquired by an image acquisition device when ambient light brightness is greater than a first preset brightness threshold, comprises:
  obtaining pixel values of respective pixels in RAW data of the first image acquired by the image acquisition device when the ambient light brightness is greater than the first preset brightness threshold as to-be-processed pixel values;
  obtaining the first pixel value of each pixel in the first image by subtracting a black level value of the image acquisition device from each of the to-be-processed pixel values.

9. An apparatus for generating image data, wherein the apparatus comprises:
  a first pixel value obtaining module, configured for obtain a first pixel value of each pixel in a first image based on original pixel values of the first image acquired by an image acquisition device when ambient light brightness is greater than a first preset brightness threshold;
  a second pixel value obtaining module, configured for obtaining a second pixel value of each pixel by dividing the first pixel value of this pixel by a preset multiple; wherein the preset multiple is a ratio of original pixel values of a second image acquired by the image acquisition device when the ambient light brightness is greater than the first preset brightness threshold to original pixel values of a third image acquired by the image acquisition device when the ambient light brightness is less than a second preset brightness threshold; the second preset brightness threshold is less than the first preset brightness threshold;
  a third pixel value obtaining module, configured for obtaining a third pixel value of each pixel by adding Poisson noise based on a total system gain of the image acquisition device on the basis of the second pixel value of this pixel; wherein, the total system gain is determined based on a distribution of original pixel values of a fourth image including a gray-scale plate acquired by the image acquisition device; and
  an image data generation module, configured for generating original pixel values of a target image which corresponds to the first image for which the ambient light brightness is less than the second preset brightness threshold based on respective third pixel values.

10. The apparatus of claim 9, wherein the third pixel value obtaining module comprises:
  a first charge number obtaining sub-module, configured for obtaining a number of charges corresponding to each pixel as a first charge number by dividing the second pixel value of this pixel by the total system gain of the image acquisition device;
  a second charge number obtaining sub-module, configured for obtaining a second charge number corresponding to this pixel by adding Poisson noise on the basis of the first charge number corresponding to this pixel; and
  a third pixel value obtaining sub-module, configured for obtaining the third pixel value of this pixel by multiplying the second charge number corresponding to this pixel by the total system gain.

11. The apparatus of claim 9, wherein the apparatus further comprises:
  a fourth image obtaining module, configured for obtaining a plurality of fourth images including gray-scale plates acquired by the image acquisition device;
  a calculation module, configured for calculating a mean and a variance of original pixel values of respective fourth images for each pixel;
  a linear fitting module, configured for performing a linear fitting on means and variances corresponding to respective pixels by taking the mean as an abscissa and the variance as an ordinate to obtain a target line; and a total system gain determination module, configured for determining a slope of the target line as the total system gain.

12. The apparatus of claim 11, wherein the image data generation module comprises:
   a fourth pixel value obtaining sub-module, configured for obtaining a fourth pixel value of each pixel by adding read-in noise and/or row noise on the basis of the third pixel value of this pixel; and
   an image data generation sub-module, configured for obtaining original pixel values of the target image which corresponds to the first image for which the ambient light brightness is less than the second preset brightness threshold based on respective fourth pixel values.

13. The apparatus of claim 12, wherein the read-in noise conforms to a first Gaussian distribution, a mean of the first Gaussian distribution is 0, and a variance of the first Gaussian distribution is a square root of a numerical value of the ordinate when the abscissa in the target line is 0;
   the row noise conforms to a second Gaussian distribution, a mean of the second Gaussian distribution is 0, and a variance of the second Gaussian distribution is a standard deviation of respective row pixel values in a fifth image acquired by the image acquisition device when an exposure time is 0 and an incident light intensity is 0, wherein one row pixel value is a mean of original pixel values of one row of pixels in the fifth image.

14. The apparatus of claim 9, wherein the apparatus further comprises:
   a training module, configured for training, after generating original pixel values of a target image which corresponds to the first image for which the ambient light brightness is less than the second preset brightness threshold based on respective third pixel values, an image enhancement network model to be trained until it converges to obtain an image enhancement network model by taking original pixel values of the target image as input data and the first pixel values as corresponding output data.

15. The apparatus of claim 14, wherein the image enhancement network model comprises an encoding part and a decoding part, and input data of each network layer of the decoding part is obtained by superimposing a first characteristic diagram output by a previous network layer of the network layer with a second characteristic diagram output by a network layer in the encoding part corresponding to the network layer.

16. The apparatus of claim 9, wherein the first pixel value obtaining module comprises:
   a to-be-processed pixel values obtaining sub-module, configured for obtaining pixel values of respective pixels in RAW data of the first image acquired by the image acquisition device when the ambient light brightness is greater than the first preset brightness threshold as to-be-processed pixel values; and
   a first pixel value obtaining sub-module, configured for obtaining the first pixel value of each pixel in the first image by subtracting a black level value of the image acquisition device from each of the to-be-processed pixel values.

17. An electronic device, wherein the electronic device comprises a processor, a communication interface, a memory and a communication bus, wherein the processor, the communication interface and the memory communicate with each other via the communication bus;
   a computer program is stored in the memory;
   the processor performs the method of claim 1 when executing the program stored on the memory.

18. A non-transitory computer readable storage medium, wherein a computer program is stored in the computer readable storage medium, which, when executed by a processor, cause the processor to perform the method of claim 1.

* * * * *